United States Patent [19]

Magni et al.

[11] Patent Number: 5,175,247
[45] Date of Patent: Dec. 29, 1992

[54] METHOD FOR REMOVING $AlCl_3$-BASED CATALYST RESIDUES FROM POLYMER MIXTURES

[76] Inventors: Ambrogio Magni, Viale Ugo Festini, 20 Paderno D'Adda; Attilio Sioli, Via F. Ili Zoia, 49 Milan, both of Italy

[21] Appl. No.: 562,513

[22] Filed: Aug. 3, 1990

[30] Foreign Application Priority Data

Aug. 9, 1989 [IT] Italy .............................. 21493 A/89

[51] Int. Cl.⁵ ................................................ C08F 6/08
[52] U.S. Cl. .................................... 528/485; 526/237; 526/238
[58] Field of Search ................. 528/485; 526/237, 238

[56] References Cited

U.S. PATENT DOCUMENTS 3,929,747 12/1975 Kudo et al. .................... 526/237
4,151,338 4/1979 Hasser et al. .................. 526/237

FOREIGN PATENT DOCUMENTS 0035896 9/1981 European Pat. Off. .
1148477 12/1957 France .

Primary Examiner—Joseph L. Schofer
Assistant Examiner—David Wu

[57] ABSTRACT

A method is described for removing catalyst residues comprising $AlCl_3$ and/or its complexes from polymer products deriving from the (co)polymerization of olefinic cuts, the method comprising bringing the polymerized mass into contact with organometallic compounds, treating the resultant mixture with water or with aqueous acid or basic solutions, and separating the organic phase, which is substantially free of inorganic residues.

14 Claims, No Drawings

METHOD FOR REMOVING ALCL$_3$-BASED CATALYST RESIDUES FROM POLYMER MIXTURES

This invention relates to a method for removing catalyst residues comprising AlCl$_3$ and/or its complexes from polymer products deriving from the Friedel-Crafts polymerization of ethylenically unsaturated hydrocarbons or hydrocarbon mixtures.

The name Friedel-Crafts defines a various collection of reactions linked together by the common use of cationic catalyst systems based on Al, Fe, Zn, B, Sn and other halides. These reactions include alkylation, ketone synthesis, isomerization and polymerization, among many others.

For the purposes of the present invention, the Friedel-Crafts catalysis considered will be that involved in polymerization reactions initiated by AlCl$_3$-based catalyst systems. An example of polymerization initiated by AlCl$_3$-based systems is the polymerization of unsaturated hydrocarbon mixtures based on mainly C4, C5 and higher olefinic and diolefinic monomers of aliphatic, cycloaliphatic and aromatic type.

Other examples of polymerization initiated by AlCl$_3$-based systems are the polymerization and copolymerization of natural monomers such as terpenes, with other unsaturated organic compounds. Such polymerizations are generally conducted in continuous reactors, although batch or semi-continuous reactors can also be used, in the although not strictly necessary presence of an inert diluent, at a temperature generally exceeding 0° C. These polymerizations enable hard and fragile resins to be prepared suitable for use in formulations for adhesives, inks or oils some of which have siccative characteristics, i.e. products with characteristics intermediate between resins and oils. The separation of the polymer from the reaction mixture requires the deactivation and removal of the catalyst residues from it. The procedures indicated by the prior art include aqueous acid, neutral and basic treatment, as indicated in U.S. Pat. No. 2,335,912, U.S. Pat. No. 2,391,293 and U.S. Pat. No. 1,938,320, and alcohol and ammonia treatment as indicated in U.S. Pat. No. 1,939,932 and U.S. Pat. No. 2,287,535. The common drawbacks of these procedures are the ready formation of emulsions if aqueous solutions are used, and contamination of the hydrocarbon solvent if alcohol is used, and which must be removed before any reuse of the solvent to avoid the formation of stable inactive complexes of it with AlCl$_3$.

Other known procedures include the use of oxides and hydroxides such as CaO, Ca(OH)$_2$, MgO and Mg(OH)$_2$, possibly in the presence of controlled quantities of water, as described in U.S. Pat. No. 2,734,892. In this case the drawbacks derive from the need to filter off a solid residue which can be in gelatinous form, and the accompanying difficulty thereof.

It has also been found that using procedures of the known art, a consistent quantity of the chlorine originally pertaining to the AlCl$_3$ or to its complexes becomes bound in organic chloride form to the polymer and to its unreacted monomers.

This fact gives rise both to a quality problem for the polymer, which because it contains chlorine in organic form can release it as HCl during treatment and high temperature processing, with consequent equipment corrosion and colour degradation, and to a disposal problem for possible effluent hydrocarbon mixtures, which as they contain chlorine cannot be burned directly in normal combustion furnaces.

The object of the present invention is therefore to provide a method for removing catalyst residues containing AlCl$_3$ or its complexes from the products of the Friedel-Crafts polymerization of ethylenically unsaturated hydrocarbon mixtures, which obviates the stated drawbacks of the known art.

A particular object of the present invention is to provide a method which enables AlCl$_3$-based catalyst residues to be removed from unsaturated polymerization products without undesirable emulsion formation, and which results in a considerable reduction in the organic chlorine bound both to the polymer and to the effluent.

In accordance with the aforegoing, the present invention provides a method for the removal of catalyst residues present in polymers prepared from olefinic hydrocarbons or their mixtures by a Friedel-Crafts reaction, the method comprising the following three basic operations:

treating the polymerized mixture with an organometallic compound, preferably a metal alkyl or a metal hydride;

treating the resultant mixture from the previous stage with water or aqueous solutions of acids or bases;

separating the desired organic phase.

Said method enables high purity polymers to be obtained, and which form an integral part of the present invention.

Specifically, in the method according to the present invention, an organometallic reagent chosen from metal alkyls and metal hydrides of at least one metal chosen from Al, Fe, Co, Ni, V etc. is added to the mass resulting from the polymerization reaction, the reagent preferably being at least one organometallic derivative of aluminum such as AlEt$_3$, AlEt$_2$Cl, AlEtCl$_2$, or Al(i-But)$_2$H. The contact between the resultant mixture from the polymerization reaction and the aforesaid organometallic derivative is effected at a temperature of between $-20°$ C. and $+200°$ C., and can be protracted with time while the reaction mass progressively clears. Water or an aqueous solution of an acid or base is then added to the resultant product at the same temperature as that at which the reaction with the organometallic derivative is conducted, which is preferably ambient temperature. Operating with solutions between 0.5 and 5N is preferred, with absolute preference for normal sodium hydroxide solutions.

The clarified organic phase free of inorganic residues is rapidly decanted from the aqueous phase without emulsion formation, and the products contained in the organic phase, such as the polymer in the case of a polymerization reaction, can be recovered by known methods.

As specified heretofore, only a small quantity of the organometallic reagent is used for contacting the catalyst residues. An organometallic/AlCl$_3$ molar ratio of between 0.5 and 2 can be conveniently used, although there are no restrictions on the use of a higher ratio other than those dictated by economic reasons.

The practical reactant quantities to be used in the second stage of the described method of the present invention are generally between 0.5 times and twice the volume of the polymer mass to be treated.

If the protic solvent consists of dilute solutions of acids or bases, their concentration is generally less than 5N and preferably not greater than 2N.

Having described the general aspects of the invention, the following examples are provided to illustrate certain details thereof, but are in no case to be considered limitative.

Unless otherwise specified, all stated compositions and percentages are by weight.

EXAMPLE 1

1000 g of a selected cut of hydrocarbon monomers deriving from steam cracking having the following composition:

| Component | wt % |
| --- | --- |
| 1-butene | 0.84 |
| 1,3-butadiene | 1.67 |
| butane | 1.10 |
| trans-2-butene | 1.14 |
| cis-2-butene | 1.50 |
| 1,2-butadiene | 0.24 |
| 3-methyl-1-butene | 0.73 |
| isopentane | 9.58 |
| 1,4-pentadiene | 1.46 |
| 2-butyne | 0.33 |
| 1-pentene | 3.44 |
| 2-methyl-1-butene | 5.14 |
| pentane | 13.63 |
| isoprene | 6.96 |
| trans-2-pentene | 8.80 |
| cis-2-pentene | 3.48 |
| 2-methyl-2-butene | 11.21 |
| trans-piperylene | 3.65 |
| cyclopentadiene | 0.24 |
| cis-piperylene | 1.81 |
| cyclopentene | 10.14 |
| dicyclopentadiene | 8.70 |
| higher saturateds | 4.21 | are fed into a glass rector of 2 liter volume fitted with a cooling jacket and a mechanical stirrer.

While maintaining the reaction mixture temperature at between 10° and 20° C. by circulating cooling liquid, 12 g of $AlCl_3$ are fed, under stirring, into the reactor in the form of a complex with HCl and xylene which has been prepared separately by bubbling hydrochloric acid gas into a suspension of aluminium trichloride and xylene in a 1:1 molar ratio and leaving to react for 3 hours.

On termination of polymerization the reaction mass is divided into 200 g aliquots.

One 200 g aliquot is transferred into a 2 liter glass flask fitted with a mechanical stirrer and left in contact for 30 minutes under stirring with 500 g of a 1M aqueous sodium hydroxide solution. The emulsified organic phase is then decanted and washed repeatedly with distilled water until neutral.

The neutralized organic phase is then heated to 230° C. under nitrogen at atmospheric pressure to separate the unreacted hydrocarbons and is then stripped in a nitrogen stream at 40 mm Hg to separate the oligomers from the resin.

EXAMPLE 2

A 200 g aliquot of the reaction mass divided in Example 1 is left in contact with 4.82 g of diethylaluminium monochloride $(C_2H_5)_2AlCl$ in a 400 ml reactor under stirring at 90° C. for 1 hour. The reaction mixture is cooled and then transferred into a 2 liter glass flask fitted with a mechanical stirrer and left in contact for 30 minutes under stirring with 500 ml of a 1M aqueous sodium hydroxide solution. The organic phase, which after decanting is clear, is heated to 230° C. under nitrogen at atmospheric pressure to separate the unreacted hydrocarbons and is then stripped in a nitrogen stream at 40 mm Hg to separate the oligomers from the resin.

EXAMPLE 3

The procedure of example 2 is followed but using 3.81 g of ethylaluminium dichloride $(C_2H_5)AlCl_2$.

EXAMPLE 4

The procedure of Example 2 is followed but using 2.84 g of diisobutylaluminium monohydride (i-$C_4H_9)_2AlH$.

The following table summarizes the results of the experiments described in the examples.

| Example No. | 1 | 2 | 3 | 4 |
| --- | --- | --- | --- | --- |
| Organometallic compound: | | DEAC | EADC | DIBAH |
| Grams of organomet. compound: | | 4.82 | 3.81 | 2.84 |
| Resin softening point °C.: (ASTM E 28) | 98 | 101 | 97 | 97 |
| Resin Gardner colour (1): | 7− | 5+ | 5+ | 5+ |
| Gardner colour 2 h/190° C.: | 10+ | 7+ | 7+ | 8− |
| Resin residual organic chlorine ppm: | 2400 | 660 | 150 | 1100 |

(1) measured on a 50 wt % solution in toluene.

We claim:

1. A method for removing catalyst residues comprising $AlCl_3$ and/or its complexes from polymer products deriving from the Friedel-Crafts polymerization of olefinic hydrocarbons or mixtures thereof, said method comprising:
   a) treating the polymerized mixture with an organometallic compound;
   b) treating the resultant mixture with water or an aqueous acid or basic solution to obtain an aqueous phase and an organic phase; and
   c) separating the desired organic phase.

2. A method for removing catalyst residues as claimed in claim 1, wherein the organometallic compound used in stage a) is chosen from metal alkyls and metal hydrides.

3. A method for removing catalyst residues as claimed in claim 2, wherein the organometallic compound is an aluminium compound.

4. A method for removing catalyst residues as claimed in claim 3, wherein the aluminium compound is chosen from $AlEt_3$, $AlEt_2Cl$, $AlEtCl_2$ and $Al(i-But)_2H$.

5. A method for removing catalyst residues as claimed in claim 1, wherein the treatment under a) is conducted in the presence of a quantity of organometallic compound such that the molar ratio of the organometallic compound to the Friedel-Crafts catalyst is between 0.5 and 2.

6. A method for removing catalyst residues as claimed in claim 1, wherein the treatment under a) is conducted at a temperature chosen within the range of −20° C. to +200° C.

7. A method for removing catalyst residues as claimed in claim 1, wherein the treatment under b) is conducted with an aqueous acid or basic solution at a concentration of between 0.5 and 5N.

8. A method for removing catalyst residues as claimed in claim 7, wherein the treatment is conducted with a normal sodium hydroxide solution.

9. A method for removing catalyst residues as claimed in claim 1, wherein the treatment under a) is conducted at ambient temperature.

10. A method for removing catalyst residues as claimed in claim 1, wherein the treatment under b) is conducted in the presence of an amount of water or aqueous acid or basic solution of between 0.5 and 2 times the volume of the polymer mass to be treated.

11. A method for removing catalyst residues as claimed in claim 1, wherein the separation under c) is conducted by decantation.

12. A method for removing catalyst residues as claimed in claim 1, wherein the treated polymer mass is derived from a Friedel-Crafts polymerization, and wherein the reactants fed to the polymerization are ethylenically unsaturated hydrocarbons obtained from steam cracking, or unsaturated terpene hydrocarbons.

13. A method for removing catalyst residues as claimed in claim 2, wherein the organometallic compound is chosen from aluminum, iron, cobalt, nickel, and vanadium compounds.

14. A method for removing catalyst residues as claimed in claim 4, wherein the treatment with the aluminum compound is conducted at about 90° C. for about 1 hour.

* * * * *

UNITED STATES PATENT AND TRADEMARK OFFICE
CERTIFICATE OF CORRECTION

PATENT NO. : 5,175,247
DATED : December 29, 1992
INVENTOR(S) : Ambrogio Magni, et. al.

It is certified that error appears in the above-indentified patent and that said Letters Patent is hereby corrected as shown below:

On the Title page, item [21] The Appln. No. should read --562,613--.

Signed and Sealed this

First Day of February, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,175,247

DATED : December 29, 1992

INVENTOR(S) : Ambrogio Magni et al.

It is certified that error appears in the above-identified patent and that said Letters Patent is hereby corrected as shown below:

On the title page:

Item "[73]" has been omitted; it should read as
--Assignee:  Enichem Anic S.p.A., Palermo, Italy--; and Signed and Sealed this Twenty-eighth Day of June, 1994

Attest:

BRUCE LEHMAN

Attesting Officer

Commissioner of Patents and Trademarks